Jan. 17, 1961 W. S. HIGLEY 2,968,607
PROCESS FOR PRODUCTION OF HIGH OCTANE HYDROCARBONS
Filed Oct. 15, 1956
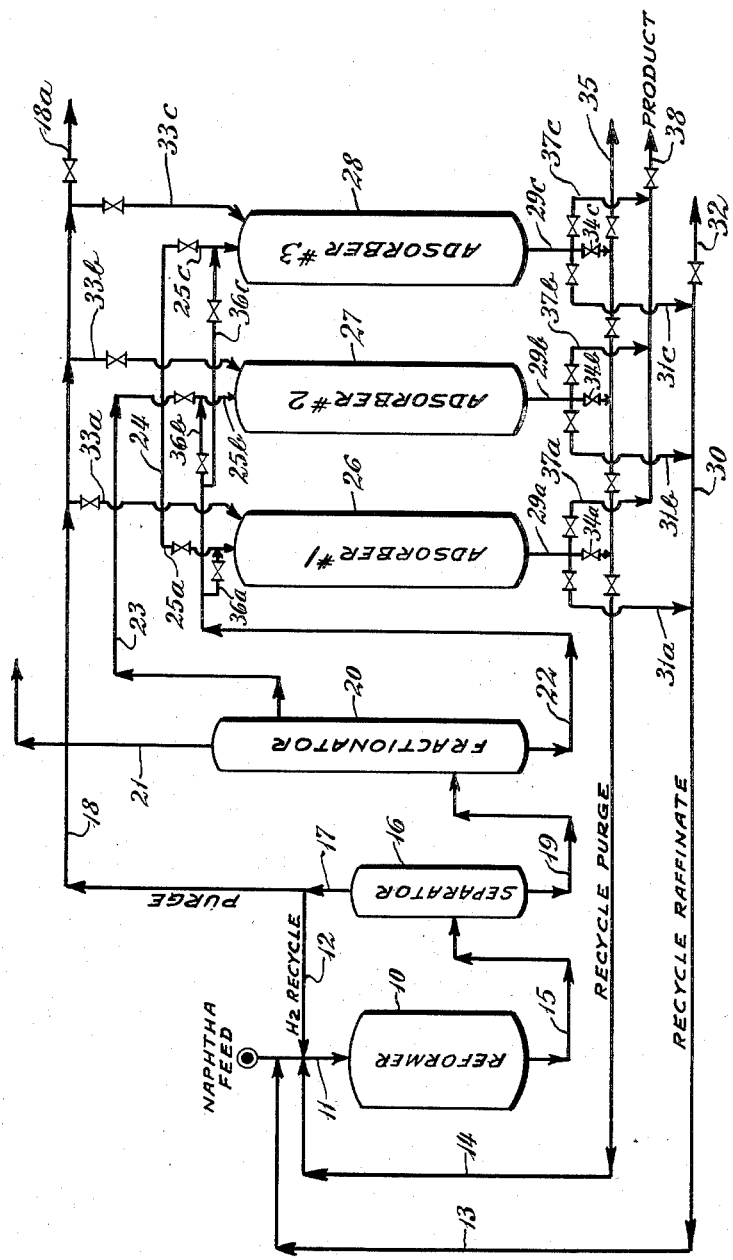
Inventor:
Willard S. Higley
By Arthur J. Gilkes
Attorney United States Patent Office 2,968,607
Patented Jan. 17, 1961

2,968,607

PROCESS FOR PRODUCTION OF HIGH OCTANE HYDROCARBONS

Willard S. Higley, Hammond, Ind., assignor to Standard Oil Company, Chicago, Ill., a corporation of Indiana Filed Oct. 15, 1956, Ser. No. 616,107

3 Claims. (Cl. 208—95)

My invention relates to the reforming of low octane hydrocarbons to produce high octane blending stocks. More particularly, it relates to the production of high octane, aromatics-rich stocks from naphtha feed stocks by an improved process of catalytic reforming integrated with selective fractionation and adsorption separation operations.

The current demand for high octane gasoline blending stocks has created a situation where conventional reforming, except with carefully selected feed stocks, has reached a severity level where further demands in the way of octane improvement require excessive losses of liquid product as well as excessively high catalyst costs. At severities above those producing about 95 CFRR octane reformate, there is a sharp drop-off in yield for incremental octane improvement. There is also an even sharper drop-off in the rate of catalyst activity decline, requiring frequent regeneration, and a sharply decreased catalyst life, increasing catalyst costs significantly. There have been proposals for relieving the severity requirements for production of high octane reformates, and thus keep the reforming operation within more desirable economic limits, by selective segregation of reformates into high and low octane fractions, e.g., as by solvent extraction. Solvent extraction, however, is inherently an expensive and complicated operation in terms of capital investment and operating requirements. Selective adsorption as a separation means has also been proposed, but as conventionally contemplated, it has appeared to be even more expensive than solvent extraction, largely because of the requirement of a separate solvent inventory for use in the desorption of product from the adsorbent and/or for use in activation of the adsorbent, together with the attendant equipment necessary for circulating and recovering the solvent.

According to the present invention, a simplified system for reforming followed by selective fractionation of the reformate by distillation and selective adsorption of a selected fraction of the reformate is provided. The invention has the advantage of applying selective adsorption in the separation operation only to the extent that it has some special advantage. It is applied in a manner in which continuous onstream adsorption can be provided with a minimum of equipment and without the need of extraneous fluids or solvents for recovery of product or activation of the adsorbent.

As is more specifically illustrated in the accompanying drawing, which is a simplified diagrammatic flow plan illustrating the invention, the naphtha feed to the reforming operation is contacted in a reforming zone in the usual manner to obtain a stabilized reformate of at least about 95 plus CFRR octane number. The resulting reformate is fractionated to separate the low boilers, a middle fraction boiling in the range of about 150–275° F., and a heavy fraction having an initial boiling point in the range of about 220–280° F. The middle fraction is charged to a system of adsorber chambers which are connected in a manner providing for continuous onstream flow. More than one adsorber is required because an adsorption-desorption cycle is used, comprising successive operations of adsorbing aromatics from the middle fraction, purging unadsorbed but entrained material from the chamber, desorbing adsorbed aromatics by charging heavy reformate at an elevated temperature within the desorption temperature range, and thereafter purging heavy reformate from the adsorber before repeating the cycle.

As illustrated in the drawing, the feed is charged to a reformer in reforming zone 10 via line 11. More than one reactor is normally used in reformer 10 in the manner customary in the fixed bed catalytic reforming art. Recycle hydrogen gas is mixed with feed in line 11 from connection 12. Recycle streams may also be added to the fresh feed by means of lines 13 and 14.

The effluent from reformer 10 is passed by means of line 15 to high pressure separator 16. A recycle gas stream is recovered in separator 16 through line 17 for recycle via connection 12, or for use as purge gas, as will be described below, through line 18. Excess gas can be vented from the system through valved connection 18a.

The liquid reformate is withdrawn from separator 16 through line 19 to additional fractionation equipment. For the purposes of describing the invention, the fractionation can be visualized as being conducted in fractionator tower 20. A light overhead cut boiling below about 150–160° F. may be withdrawn overhead in fractionator 20 by means of line 21. A heavy fraction having an initial boiling point in the range of about 220–275° F., as will be explained in greater detail below, is withdrawn from fractionator 20 by means of line 22. A middle cut boiling in the range of about 150–280° F. is withdrawn through line 23.

The middle, or intermediate cut, withdrawn through line 23 is charged according to the invention through line 23, manifold 24 and one of the valved connections 25a, 25b or 25c to one of the adsorber chambers 26, 27 or 28. Because this cut is recovered as a distillate, or condensate, it will be cool, e.g., about 100° F. or lower, depending upon atmospheric conditions. Each of the adsorber chambers is filled with a body of silica gel adsorbent in particle form. In passing through the onstream adsorber chamber 26, 27 or 28, aromatics are selectively adsorbed by the silica. The dearomatized material, or raffinate, is withdrawn from the opposite end of the onstream adsorber chamber through one of valved connections 29a, 29b or 29c and from thence to recycle via one of connections 31a, 31b or 31c to manifold 30, and line 13 or via valved connection 32 to other use.

The flow of the middle cut through the onstream adsorber is advantageously continued until a breakthrough of aromatics occurs, indicating saturation of the silica gel adsorbent bed. At this point, the flow of middle cut in line 23 is diverted to a second adsorber, and liquid entrained in the saturated adsorbent body of the first onstream chamber is purged by charging recycle hydrogen gas from line 18 through the appropriate valved connection 33a, 33b or 33c to the first onstream chamber 26, 27 or 28. Advantageously, the recycle purge stream, including entrained liquid hydrocarbons, is recycled to reformer 10 by means of the appropriate connection 29a, 29b or 29c, valved connection 34a, 34b or 34c, and line 14.

The heavy cut in line 22 is used as desorbing medium in the cycle by flowing it through the chamber containing adsorbed aromatics after the purging operation. Thus, the heavy cut is flowed from line 22, via an appropriate valve connection 36a, 36b or 36c and one of the connections 25a, 25b or 25c to the appropriate adsorber chamber 26, 27 or 28. Normally, the heavy cut will be warm, e.g., at a temperature of about 250° F. substantially higher, since it is recovered as bottoms from fractionator 20. If desired, however, the temperature of the heavy cut can be adjusted by passage through a suitable heat exchange system to bring it to any desired desorption temperature. The flow of the heavy cut at elevated temperature through chamber 26, for example, simultaneously strips the adsorbed aromatic from the silica gel and blends them into the heavy cut so that the stream flowing from the chamber undergoing desorption, as by connection 29a, 29b or 29c and one of the connections 37a, 37b or 37c to product line 38, is a full range aromatics cut of extremely high octane number. The flow of the heavy cut through the chamber undergoing desorption can be continued until tests of the product stream in line 38 show that there is no further pick-up of light aromatics by desorption. It is an advantage of the invention, however, that the flow of the heavy cut stream can be correlated time-wise with the flow of the intermediate cut through the chamber undergoing the adsorption phase of the cycle in a manner assuring continuous operation without loss or contamination of product. Before returning the desorbed chamber to the adsorption phase of the cycle, it is advantageous to purge the chamber, i.e., 26, 27 or 28, by charging recycle purge gas to the desired chamber by means of line 18, and valved connection 33a, 33b or 33c. As in the case of the purge following the adsorption phase of the cycle, it is desirable to recycle the purge gas stream containing entrained hydrocarbons via connections 29a, 29b or 29c and 34a, 34b or 34c, to line 14. If preferred, the purge stream can be separately processed, via line 35, to recover the liquid aromatics for blending or other use.

In operation, the feed stock may comprise any desired naphtha cut, e.g., a $C_6+$ Mid-Continent virgin naphtha. The reformer indicated diagrammatically in the drawing ordinarily comprises a multi reactor unit of the fixed bed type. The use of a platinum-alumina catalyst is preferred although other types of reforming catalysts, e.g., a molybdenum oxide-alumina type, and other supports including silica/alumina, for example, may be used. The presence of halide, i.e., chloride or fluoride, in the system may be desirable. The catalyst is handled in the form of pellets, beads, or the like, arranged in the form of a fixed bed in each reactor. The use of the catalyst in the form of finely divided particles in a fluidized system, however, is contemplated although the fixed bed system is the system of present commercial choice.

The feed recycle gas is preheated to a temperature in the range of about 900 to 1050° F., and interheating between reactors is provided so as to provide an average temperature in the reforming zone in the range of about 900–1000° F. as is customary in establishing reforming conditions. The average pressure is in the range of about 50 to 500 p.s.i.g., preferably about 150 to 400 p.s.i.g. The rate of hydrogen recycle is in the range of about 2000 to 10,000 s.c.f. per barrel of feed. The space velocity is in the range of about 0.5 to 5 on a weight hourly basis of feed to catalyst.

The effluent from the reforming zone is desirably separated into a recycle gas fraction and a liquid reformate fraction prior to further fractionation. Initial separation is effected at high pressure, i.e., at a pressure of the order of the reforming pressure. The reformate may be further stabilized by depropanizing in conventional manner before splitting into a heavy fraction and an intermediate fraction boiling in the range of about 150–275° F. The operation of the fractionation will depend on the feed to the reforming zone, the severity of the conditions in the reforming zone and various design factors relating, for example, to whether one or several towers are employed.

A primary variable is the severity of reforming which should be sufficient to provide a heavy fraction having an initial boiling point in the range of about 220–280° F., and an aromatics content of at least 85–90 volume percent. For most feed stocks, a severity producing a $C_5+$ stabilized reformate of about 95+ CFRR octane number is required. With heavier stocks, i.e., $C_7+$, and highly naphthenic stocks milder severities may be used than in the case of broader range feed stocks containing $C_6$'s and lighter or than in the case of paraffinic feed stocks. The desired severity is obtained in known manner by adjusting temperature and/or space velocity for a given catalyst activity. The distillation of the stabilized reformate can be conducted in a single column, or $C_5$ and lighter hydrocarbons can be removed in a preliminary column. The object is to remove hydrocarbons boiling lower than about 150–160° F. as a light cut while recovering a middle cut boiling in the range of about 150–280° F., and a heavy cut having an initial boiling point of 220–275° F., depending upon the concentration of aromatics in the reformate. With reforming severities higher than 95 CFRR and preferably in the range of 100 CFRR, the end point of the middle cut and the initial of the heavy cut may approximate about 220–225° F. so as to include toluene in the bottoms. Because of the high concentration of aromatics in the heavy cut at these reforming severities, the heavy cut will have extrapolated octane numbers which may substantially exceed 100 CFRR. The middle cut, however, approximating about 20–50% of the reformate will have substantially lower octane number in the region of 70–85 CFRR and a much lower concentration of aromatics, e.g., about 60–75 volume percent. It is an object of the invention to provide an economical means for further separation of this cut into a high octane aromatics concentrate for blending with the heavy cut in the manufacture of super octane fuels, or for the separation of pure aromatics, while recovering the dearomatized portion, or raffinate, for recycle to the reforming zone, or for other selective handling. As described above, selective separation of aromatics in the middle cut is effected by adsorption, and these aromatics are simultaneously desorbed and blended into the heavy cut lining the desorption phase of the silica gel adsorption-desorption contacting cycle.

In general, the distillation tower should be operated to obtain the sharpest separation of the high and low octane streams. Commercially, the distillation tower may be operated, for example, at about 2:1 reflux ratio with 15 theoretical plates. The reflux ratio may be in the range from 1:1 to 5:1 with from 5 to 25 theoretical plates. The adsorption and desorption phases of the silica gel contacting cycle should be conducted with sufficient temperature differential to provide a practicable level of selectivity, e.g., upwards of 100 to 150° F. For example, the cold adsorption cycle can be carried out at temperatures ranging from 0 to 140° F., preferably in the range of about 30–100° F. The temperature of the hot desorption phase of the cycle can vary from about 140 to 650° F., preferably from about 250 to 500° F. The space velocity of the charge through the silica gel columns may vary from about 2.5 to 5 barrels of charge per ton of silica gel per hour, preferably in the range of about 5 to 15 barrels per ton per hour. The operating pressure ordinarily will be that imposed by the design of the preceding fractionation system since this is not an operating variable affecting the system over the range of temperatures contemplated.

The silica gel may lose some of its activity because of the adsorption of polar compounds in the oil which may build up over a series of many cycles. The use of the hydrogen purge is beneficial in maintaining activity, but the silica gel can also be reactivated by a treatment with a highly polar solvent such as methanol. The excess methanol then can be removed by heat or by inert gas stripping or a combination thereof.

In an example illustrating operation according to the invention, a Mid-Continent heavy virgin naphtha is reformed to 93.5 CFRR. The $C_5+$ reformate has the properties shown in the following table:

Table I

ASTM distillation:
| | |
|---|---|
| IBP | 126 |
| 10% | 185 |
| 20% | 214 |
| 30% | 238 |
| 40% | 257 |
| 50% | 274 |
| 60% | 290 |
| 70% | 306 |
| 80% | 321 |
| 90% | 345 |
| Max. | 428 |

Gravity:
| | |
|---|---|
| °API | 45.2 |
| Sp. g. | 0.801 |

Hydrobot:
| | |
|---|---|
| $C_5$, wt. percent | 1.0 |
| $C_4$, wt. percent | 3.7 |
| $C_6+$, wt. percent | 95.3 |
| $C_6+$, gravity | 0.813 |

Octane No.:
| | |
|---|---|
| Clear | 93.5, ᵃ94.2 |
| +3 cc. TEL | 100.0, ᵃ100.0 |

ᵃ Determined on aged sample.

The reformate is split in a fractionator into three fractions, cut A, distilling below 156° F., cut B, distilling from 156° to 271° F., and cut C, distilling from 271 to 428° F.

The properties were as follows:

| | Vol. Percent | Octane Number, CFRR |
|---|---|---|
| Cut A | 15.5 | 76.6. |
| Cut B | 28.2 | 76.7. |
| Cut C | 53.3 | Isooctane+0.22 cc. TEL. |

Cut A, which has an octane number of about 76 unleaded, CFRR, and which is essentially free of aromatics, may be blended directly into gasoline or may be further processed, as by isomerization to up-grade its octane number, before blending.

Cut B is passed into a silica gel tower at ambient temperature until the effluent shows a breakthrough of aromatics. The flow of cut B, then is switched to a second tower, for continued adsorption while a stream of recycle hydrogen previously cooled to the temperature of the adsorber tower is passed through the first tower to remove any entrained but unadsorbed hydrocarbons. The recycle stream is returned to the reformer for further aromatization, with the result that no low octane compounds remain in the first tower. Cut C then, at a temperature of 250° F., is charged to the first tower, with the result that the adsorbed aromatics from cut B are simultaneously desorbed and blended into cut C. Without further treatment, the resulting blend had, in one example, an octane number equivalent to isooctane plus 0.28 cc. of tetraethyl lead. When blended with cut A, the final gasoline had an unleaded octane number of over 98 CFRR.

The aromatic-free reformate of cut B is recycled to the reformer for further aromatization. After the light aromatics are desorbed into cut C, the first tower is again purged with hydrogen recycle to strip the adsorbent of all liquid hydrocarbons, after which it is again ready for the initial adsorption phase of the cycle, charging cut B. By using three adsorption towers, operation in a continuous onstream manner is particularly facilitated. Thus, for example, while the first tower is adsorbing the light aromatics from cut B, the second tower is undergoing the desorption-blending cycle with cut C, and the third tower may be undergoing the purging-desorption cycle with recycle hydrogen.

In a comparative test of the feasibility of percolating cuts B and C through silica gel in order to selectively segregate aromatics by adsorption and subsequent stripping, it has been found that a very substantial selective up-grading is possible in the case of cut B. By contrast, silica gel percolation of cut C results in only minor upgrading in octane number, obtained at a loss of 13.5 volume percent of feed. The data on the comparative separations, using a commercial activated silica gel in the separation column in both cases, follow:

Table II

| Charge: | B | C |
|---|---|---|
| Fraction | | |
| Wt., g | 740 | 1000 |
| Refractive Index | 1.4330 | 1.4860 |
| Length of Column, ft | 42.5 | 50.0 |
| Products. Paraffins-Naphthenes: | | |
| Wt., grams | 392 | 119.5 |
| Wt., Percent | 53.0 | 12.0 |
| Refractive Index | 1.3935 | 1.4078 |
| Octane No. Clear | | 22.0 |
| Vol., Percent of total | 59.0 | 13.5 |
| Aromatics: | | |
| Wt., grams | 334 | 823 |
| Wt., Percent | 45.0 | 82.3 |
| Refractive Index | 1.4965 | 1.5012 |
| Octane No. Clear | +2.69 | +0.36 |
| Octane No. 3 cc. TEL | +2.80 | +0.90 |
| Vol., Percent of total | 39.0 | 85.5 |
| Total Recovery, Wt. Percent | 98.0 | 94.3 |

I claim:

1. A process for producing high octane gasoline blending stocks from low octane naphthas, which process comprises contacting in a reforming zone a naphtha feed admixed with a hydrogen-rich recycle gas with a platinum-alumina reforming catalyst under a combination of reforming conditions, said conditions comprising a temperature in the range of between about 900° F. to 1000° F., a pressure in the range of between about 150 to 400 p.s.i.g., a recycle gas rate in the range of about 2,000 to 10,000 s.c.f. per barrel of naphtha and a weight hourly basis velocity in the range of about 0.5 to 5, producing thereby a reformate having a $C_5+$ octane number of at least about 95 CFR-R (clear), separating the effluent from said reforming zone into a hydrogen-rich recycle gas and a liquid reformate, fractionating said liquid reformate into a light fraction boiling below about 150° F., a middle fraction boiling within the range of about 150° F. to 280° F. and a heavy fraction, said heavy fraction boiling above said middle fraction and in the range of between an initial boiling point of about 220° F. to 280° F. to the end point of said reformate, and containing at least about 85 volume percent aromatics, charging said middle fraction in the liquid phase to a first adsorber comprising a bed of silica gel in particle form, withdrawing a dearomatized raffinate from said adsorber, continuing to charge said middle fraction to said first adsorber until said silica gel becomes substantially saturated with aromatics adsorbed from said middle fraction, thereafter charging said middle fraction to a second adsorber comprising a bed of silica gel in particle form, desorbing said first adsorber by a process which comprises purging liquid from said first adsorber by passing thereunto at least a portion of said recycle gas, passing through said first adsorber at least a portion of a said heavy fraction at a temperature in the range of about 140° F. to 650° F. until desorption of aromatics previously adsorbed from said middle fraction is substantially completed, and again purging liquid from said first adsorber by passing thereinto at least a portion of said recycle gas, thereafter charging said middle fraction to the desorbed first adsorber, desorbing said second adsorber, repeating the adsorption-desorption cycle, and obtaining a high-octane gasoline blending stock by blending any remainder of said heavy fraction with the effluent removed from said adsorbers while passing thereunto at least a portion of said heavy fraction.

2. The process of claim 1 wherein said recycle gas withdrawn from said adsorbers during the purging thereof is charged to said reforming zone.

3. The process of claim 1 wherein at least three adsorbers comprising beds of silica gel are used in parallel blocked-out operation.

References Cited in the file of this patent

UNITED STATES PATENTS

| | | |
|---|---|---|
| 2,409,695 | Laughlin | Oct. 22, 1946 |
| 2,522,426 | Black | Sept. 12, 1950 |
| 2,626,893 | Morrow | Jan. 27, 1953 |
| 2,651,603 | Mortin et al. | Sept. 8, 1953 |
| 2,653,175 | Davis | Sept. 22, 1953 |
| 2,697,684 | Hemminger et al. | Dec. 21, 1954 |
| 2,818,449 | Christensen et al. | Dec. 31, 1957 |